Patented Nov. 4, 1924.

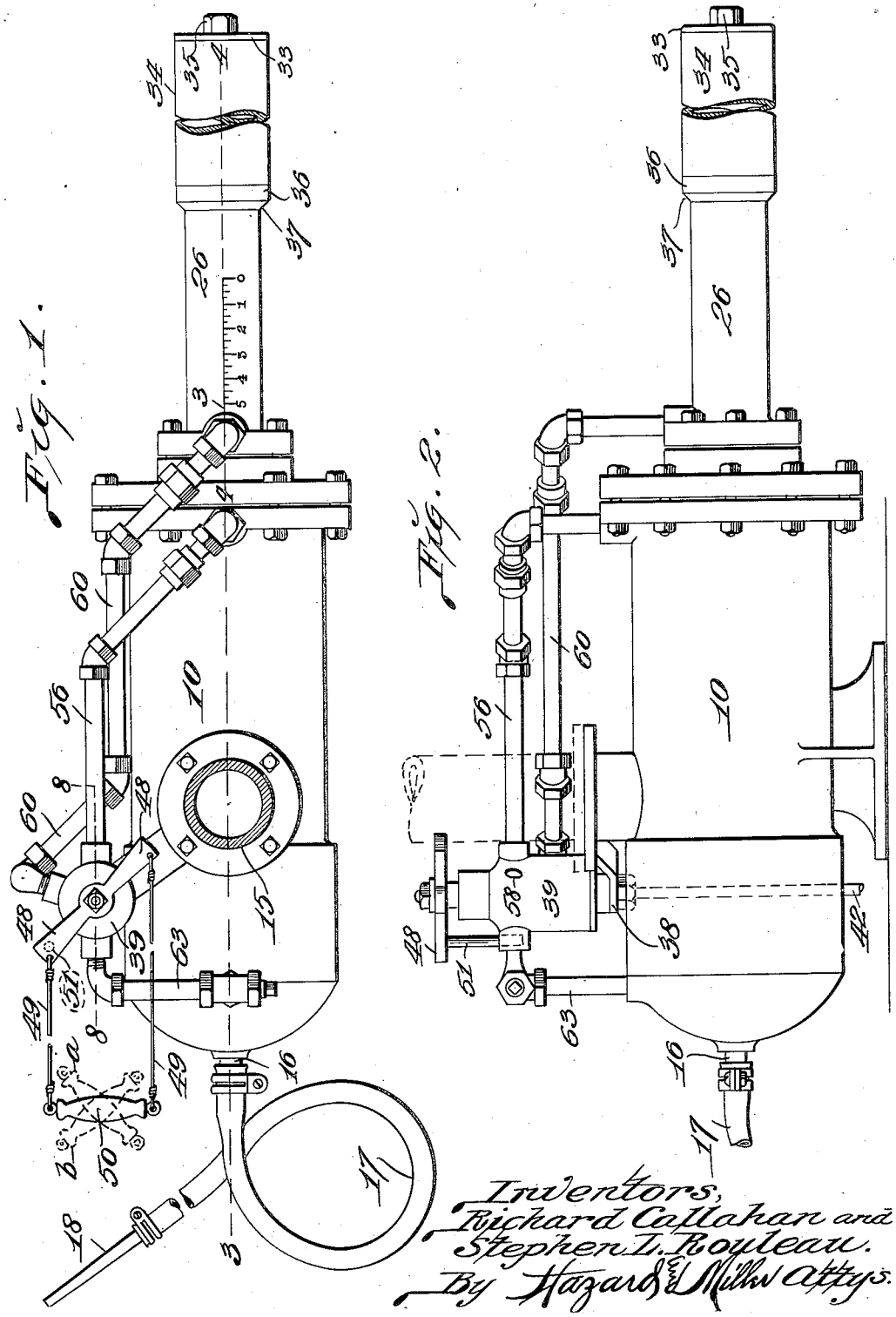

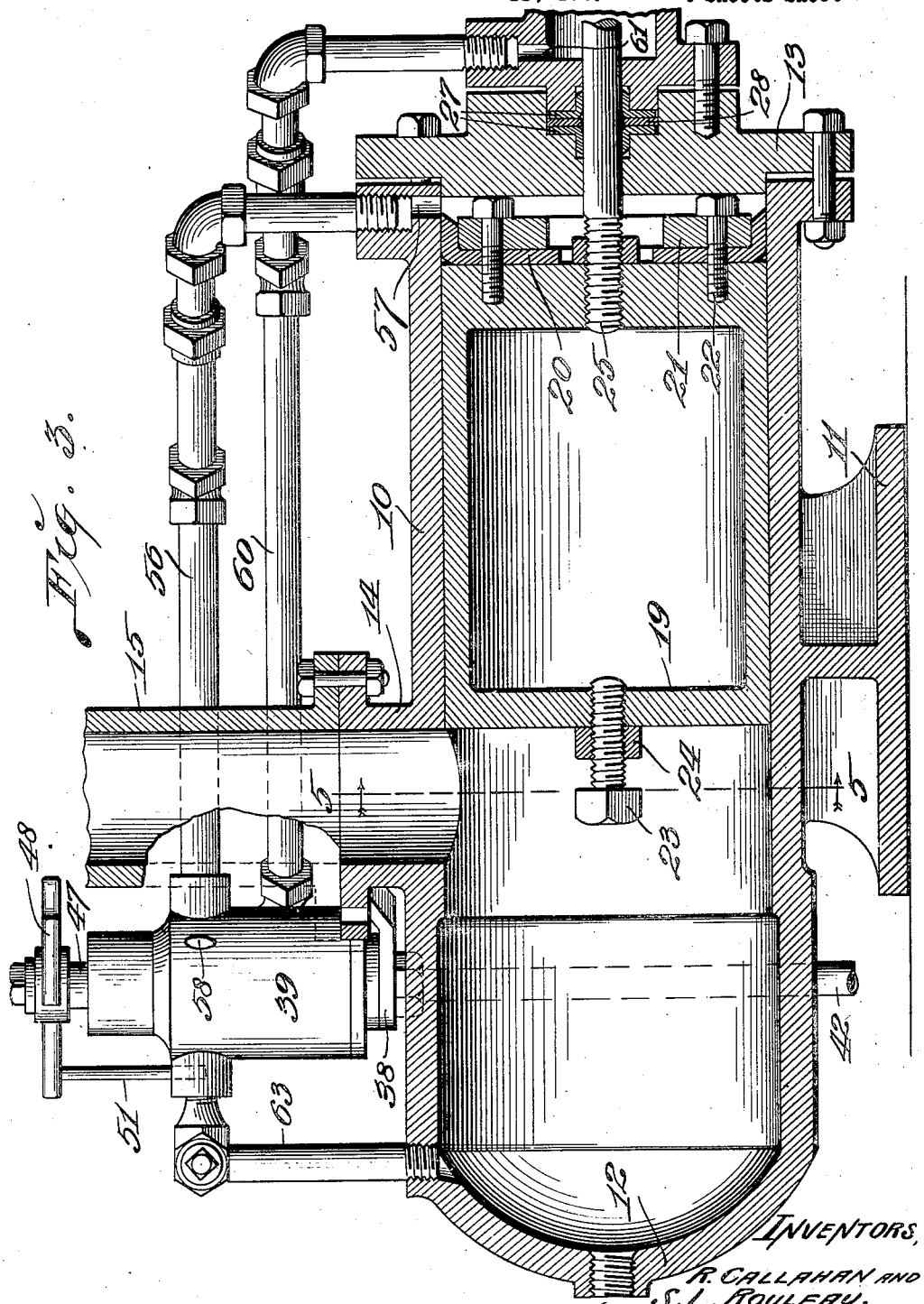

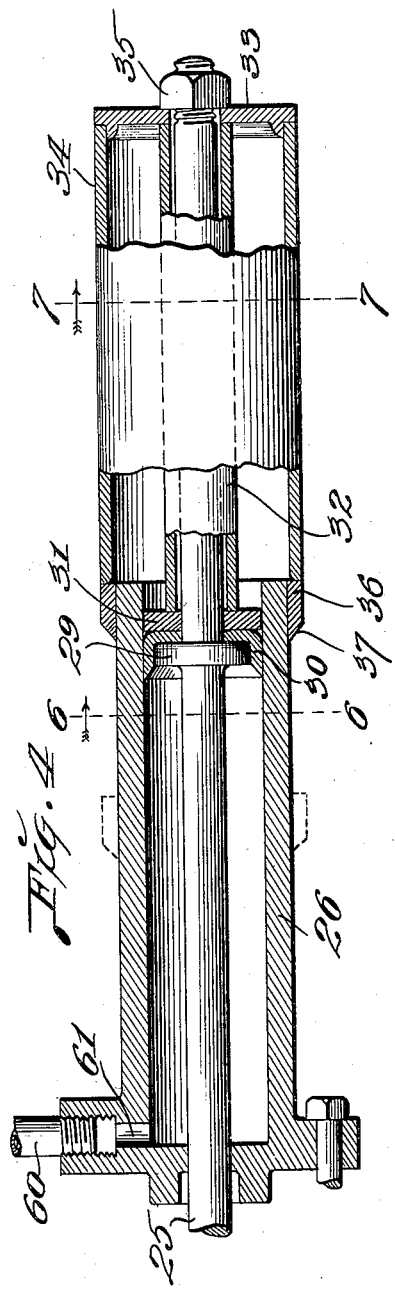
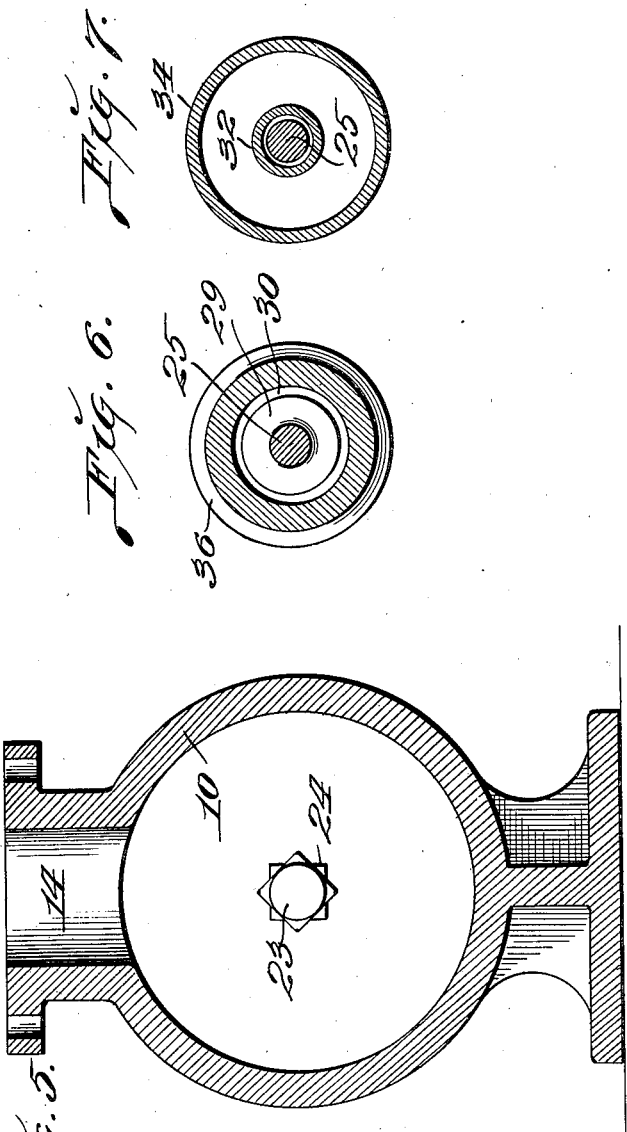

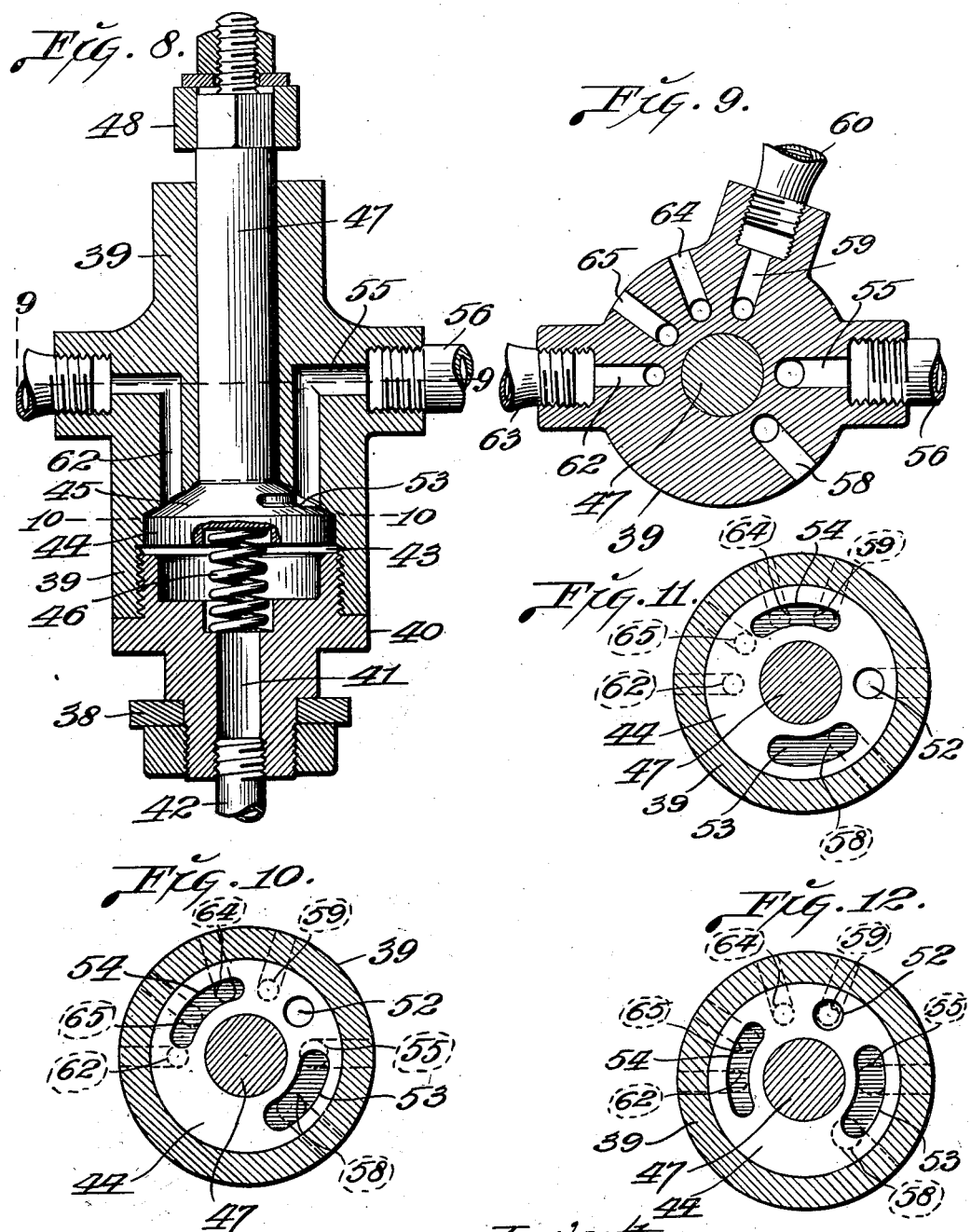

1,513,962

UNITED STATES PATENT OFFICE.

RICHARD CALLAHAN AND STEPHEN L. ROULEAU, OF LOS ANGELES, CALIFORNIA, ASSIGNORS TO SIMPLICITY OIL & GREASE PUMP COMPANY, OF LOS ANGELES, CALIFORNIA, A CORPORATION OF CALIFORNIA.

PNEUMATICALLY-OPERATED GREASE MEASURING AND DISPENSING DEVICE.

Application filed November 11, 1920. Serial No. 423,361.

*To all whom it may concern:*

Be it known that we, RICHARD CALLAHAN and STEPHEN L. ROULEAU, citizens of the United States, residing at Los Angeles, in the county of Los Angeles and State of California, have invented new and useful Improvements in Pneumatically-Operated Grease Measuring and Dispensing Devices, of which the following is a specification.

Our invention relates generally to dispensing apparatus, and more specifically to a pneumatically operated device that is particularly designed for measuring and dispensing plastic or semi-liquid commodities, the principal object of our invention being to provide a relatively simple and efficient apparatus that may be advantageously used in garages, automobile service stations, and the like, and which apparatus will be effective in accurately measuring grease or similar heavy lubricants, and delivering the same into transmission gear casings, differential gear housings, and the like.

Further objects of our invention are to provide a grease measuring and dispensing device that is operated by compressed air, the action of the latter being under the ready control of an operator; and, further, to provide a device that is very compact, capable of being easily and cheaply produced, and which is very effective in performing its intended functions.

With the foregoing and other objects in view, our invention consists in certain novel features of construction and arrangement of parts that will be hereinafter more fully described and claimed, and illustrated in the accompanying drawings in which;

Fig. 1 is a top plan view of a grease measuring and dispensing device of our improved construction.

Fig. 2 is a side elevational view of the grease dispensing device.

Fig. 3 is an enlarged vertical section taken approximately on the line 3—3 of Fig. 1.

Fig. 4 is an enlarged vertical section taken approximately on the line 4—4 of Fig. 1.

Fig. 5 is an enlarged cross-section taken approximately on the line 5—5 of Fig. 3.

Fig. 6 is a cross-section taken on the line 6—6 of Fig. 4.

Fig. 7 is a cross-section taken on the line 7—7 of Fig. 4.

Fig. 8 is an enlarged vertical section taken approximately on the line 8—8 of Fig. 1.

Fig. 9 is a horizontal section taken approximately on the line 9—9 of Fig. 8.

Fig. 10 is a horizontal section taken approximately on the line 10—10 of Fig. 8.

Fig. 11 is a horizontal section similar to Fig. 10 and showing the main control valve of the device shifted into position, so as to cause the device to perform its measuring and dispensing operation.

Fig. 12 is a section similar to Figs. 10 and 11 and showing the valve shaft into position to restore the parts of the device to their normal positions, after having performed the measuring and dispensing operation.

Referring by numerals to the accompanying drawing which illustrates a practical embodiment of our invention, 10 designates a hollow cylindrical body which serves as a container for the grease that is to be measured and dispensed, and said body being provided with a suitable base 11, whereby it will be firmly supported in a horizontal position.

The forward end of the hollow body, or container 10 is closed by a fixed head 12, and the rear end of said body is closed by a removable head or plate 13.

Projecting upwardly from the top of the body or container 10, is a short tubular extension 14, and secured to the upper end thereof in any suitable manner, is a tubular connection 15 which serves to deliver grease, or the like, from a suitable container, to the body 10 of the measuring and dispensing device.

The fixed head 12 is preferably concavo-convex, and projecting outwardly from the center thereof, is a relatively short nipple 16, through which the grease passes in discharging from the chamber in the hollow body 10.

Connected to this nipple is one end of a flexible tube 17 of any desired length and provided on its opposite end with a nozzle 18, the size and shape of which is such that it can be readily inserted in the usual filling openings of differential housings, transmission casings, and the like.

Arranged for reciprocatory movement within the container or hollow body 10, is an elongated hollow piston 19 to the rear end of which is applied a flexible packing disc 20, and the latter being held in place by a disc, or ring, 21, that is secured to the rear portion of the piston by screws, or bolts, such as 22.

Seated in the forward end of piston 19 is the threaded shank of an axially disposed bolt 23, and, positioned thereupon is a nut 24 that is utilized for locking the bolt in its adjusted position in said piston.

Screw seated in the rear end of piston 19 is the threaded forward end of an axially disposed piston rod 25, and which latter projects through and a substantial distance rearwardly from, the head 13.

The rearwardly projecting portion of the piston rod 25 extends through a relatively small cylinder 26, the forward end of which is secured in any suitable manner to plate 13, and arranged between the forward end of said cylinder 26 and the plate 13 is a gland comprising a pair of flexible packing rings 27, between which is arranged a ring or plate 28.

This gland occupies a suitable recess formed in head 13 around the opening through which the piston rod 25 passes, and said gland is normally held under compression by reason of the fact that it is clamped between the rear end of cylinder 26 and head or plate 13.

Formed on, or fixed to the rear portion of piston rod 25 is a disc 29, and arranged on the rear side thereof is a flexible disc 30. Positioned against the rear side of disc 30 is a disc or washer 31, and which latter, together with the flexible disc 30 and disc 29, constitutes a piston that is adapted to reciprocate within cylinder 26.

Bearing against the rear side of disc 31 is the forward end of a tube 32 that encloses the rear portion of piston rod 25, and the rear end of said tube bears directly against the disc 33, the same serving as the rear head, or closure plate for a cylindrical member 34, and which latter is adapted to slide or telescope upon cylinder 26. The rear end of rod 25 is threaded to receive a nut 35, which latter, when tightened clamps disc 33 against the rear end of tube 32, and consequently clamping said tube between the discs 31 and 33.

Arranged for sliding movement upon cylinder 26 is a ring 36 that is provided with a bevelled forward edge 37, said ring serving as a gauge and marker to indicate upon a graduated scale, that is formed on the surface of cylinder 26 the amount of grease or like product that is dispensed in our improved apparatus.

The arrangement and location of this graduated scale is best seen in Fig. 1, and by virtue of the relative position of the forward end of piston 19, with respect to the opening through the tubular inlet 14, the first mark on the graduated scale is located a considerable, and predetermined distance in front of the gauge ring 36, when the same occupies its normal position upon the rear portion of cylinder 26.

The internal diameter of cylinder 34 is slightly larger than the external diameter of cylinder 26, and the forward end of said cylinder 34 normally bears against the rear edge of gauge ring 36, as illustrated in Figs. 1, 2 and 4.

Positioned adjacent to the forward end of cylinder 10, and supported upon a horizontally disposed bracket 38 that projects outwardly from the upper portion of tubular member 14, is a pneumatic valve that controls the movements of the operating parts of our improved device, said valve including a substantial cylindrical valve housing 39 that occupies an upright position, and its lower end being closed by a screw plug 40, and which latter is secured in any suitable manner to the plug 38.

Formed through plug 40 is an axially disposed passageway 41, and tapped into the lower end thereof is a tube 42 that is connected to a suitable source of compressed air supply.

Formed in the housing 39, above plug 40, is a valve chamber 43, having a substantial conical top surface and positioned within said chamber is a disc valve 44 that is provided with a conical upper surface 45 that fits snugly against the correspondingly shaped upper surface of chamber 43.

Positioned beneath valve 45 is a compression spring 46 that normally exerts upward pressure against the valve and maintains its conical upper surface 45 in close contact with the surface at the top of chamber 43.

Formed integral with, or fixed to valve 44 and projecting upwardly therefrom, is an axially disposed stem 47 that is rotatably arranged in the upper portion of housing 39, and secured in any suitable manner to the upper end of the valve stem is a cross-bar, or lever, 48 that forms a part of the valve actuating mechanism.

Secured to the ends of the cross-bar or lever 48 are flexible cords or cables 49, of any desired length, and connecting the opposite ends of these cords or cables is an operating handle 50.

Depending from one end of the cross-bar, or lever, 48 is a pin 51 that performs the functions of a stop; to limit the swinging movement of said bar or lever.

Formed through the body of valve 44 is a vertically disposed aperture 52, and formed in the inclined or bevelled upper surface of said valve and on opposite sides of the aperture 52, are arcuate recesses 53 and 54. the same being adapted to register with certain parts that are formed through the valve housing 39.

Formed in the wall of valve housing 39, above the valve therein, is an inverted L-shaped port 55, and connected to the valve housing and communicating with the outer end of the horizontal leg of this port is one end of tube 56 that leads to a port 57, and which latter is formed through the wall of cylinder 10, adjacent to the rear end thereof. (See Fig. 3.)

The lower end of the vertical leg of port 55 is adapted to register with aperture 52 and recess 53, that are formed in valve 44.

Formed in the wall of the valve housing adjacent to port 55 is an inverted L-shaped exhaust port 58, the lower end of the vertical leg of which is adapted to register with valve recess 53.

Formed in the wall of valve housing 39 and arranged approximately 40° or 45° from port 55 is an inverted L-shaped port 59, the lower end of the vertical leg of which is adapted to register with valve recess 54. Connected to valve housing and communicating with the horizontal leg of port 59 is a tube 60 that extends to a port 61, and which latter is formed through the wall of cylinder 26 adjacent to the forward end thereof. (See Fig. 4.)

Formed in the wall of valve housing 39 and oppositely disposed with respect to port 55, is an inverted L-shaped port 62, the lower end of the vertical leg of which is adapted to communicate with valve recess 54.

Connected to the valve housing and communicating with the horizontal leg of port 62 is one end of a vent pipe 63, the opposite end thereof being tapped into the forward end of cylinder 10. (See Fig 3.)

Formed in the wall of valve housing 39 and arranged between ports 59 and 62 are inverted L-shaped ports 64 and 65, and the lower ends of the vertical legs thereof are adapted to communicate with valve recess 54.

The operation of our improved grease measuring and dispensing device is as follows:

Under normal conditions, or while out-of-service, the operating parts of the device occupy the positions as illustrated in Figs. 1, 3 and 4, with the piston 19 in its retracted position. It will be understood that gauge ring 36 is loose upon cylinder 26 and prior to a measuring and dispensing operation this gauge ring should be moved to its rearward limit movement, or, as illustrated in Fig. 4, with its rear edge bearing against the forward edge of cylinder 34.

Under normal conditions valve 44 occupies the position as illustrated in Fig. 10, with port 52 closed and with recess 53 in position to establish communication between ports 55 and 58.

The grease, or similar plastic substance to be measured and dispensed, passes by gravity downward through the tubular members 14 and 15, thereby completely filling the chamber and cylinder 10 in front of piston 19.

The operator carries the nozzle 18 and operating handle 50 to a point convenient to the housing or casing that is to be filled with grease and, after the end of said nozzle is inserted in the filling opening in said housing or casing, handle 50 is shifted into the angular position as illustrated by dotted lines a, Fig. 1, which action exerts a pull upon one of the cords or cables 49, and slackens the other, thereby swinging the bar or lever 48 until the depending pin 51 strikes against the adjacent end of pipe 60, such action serving to stop the swinging movement of the lever and insuring the proper position of the valve that controls the parts in the valve housing. As lever 48 is thus actuated, valve stem 47 and valve 44 will be rotated so that said valve will be shifted into the position as illustrated in Fig. 11.

When so positioned, aperture 52 is in register with the lower end of port 55, and the lower ends of ports 59 and 64 are in communication through recess 54. With the valve thus positioned, compressed air is free to pass from said pipe 42 through passageway 41, from thence through valve chamber 43, through aperture 52 and port 55, and from thence through tube 56 into the chamber within cylinder 10 to the rear of piston 19. As the compressed fluid is admitted to the rear of piston 19, it will move the same forwardly through cylinder 10 and simultaneous with these movements the piston, or rod, 25 within cylinder 26 will move to the forward end of the last mentioned cylinder, and any air in front of the last mentioned piston is free to exhaust through tube 60, port 59, recess 54 and port 64.

During the time the forward end of piston 19 is moving across the opening through tubular extension 14, there will be no feeding movement of grease through the flexible tube 17, due to the relatively small area of said tube with respect to the relatively large area of the opening through tubular extension 14, and the excess volume of grease in front of the piston will be forced upwardly through tubular members 14 and 15 until the forward end of the piston entirely closes the opening through tubular member 14.

In view of the conditions just recited, the first graduation of the scale on the exterior of cylinder 21 is placed at a predetermined point away from the forward edge from gauge ring 36, while the latter is in its normal position, and as a result the measuring of the grease that is being dispensed does not begin until the parts have reached that point in the operations where the grease is beginning to discharge from nozzle 18.

As the piston 19 continues to move outwardly in cylinder 10, the grease within the chamber in front of said piston will be forced out through flexible tube 17 and nozzle 18 and, by the latter, said grease will be discharged directly into the gear housing or casing.

When a sufficient amount of grease has been discharged and delivered into the gear casing or housing, the operator, to make the alternative connections that will cause a rearward movement of the piston, shifts handle 50 from the position illustrated by dotted lines *a* in Fig. 1 to the position illustrated by dotted lines *b*. The movement of lever 48, as just described, is stopped by the engagement of pin 51 with pipe 63. By this action, valve steam and valve are rotated so as to position the latter as illustrated in Fig. 12, with aperture 52 in register with lower end of port 59, and with port 62 and 65 in communication through recess 54. Thus the flow of compressed air is cut off from port 55 and said compressed air will pass from valve chamber 43 through aperture 52 to port 59, and from thence through tube 60 and through port 61 into the forward portion of the chamber in cylinder 26.

The compressed air entering said chamber will move the piston comprising the parts 29, 30 and 31 rearwardly through the small cylinder, and such movement necessarily moves piston 19 to its rearward limit of movement in cylinder 10. As piston 19 moves rearwardly in cylinder 10, air, at atmospheric pressure, enters port 65 and passes from thence through recess 54, port 62 and tube 63, and thus air is admitted to the forward end of the chamber within cylinder 10 to prevent the formation of a partial vacuum therein as a result of the rearward movement of piston 19. As piston 19 moves rearwardly in cylinder 10, as just described, the compressed air previously admitted to said cylinder behind said piston to drive the latter forwardly, will exhaust through port 57, tube 56, port 55, recess 53 and exhaust port 58, it being understood that when the valve is shifted into the position as illustrated Fig. 12, said recess 53 establishes communication between the lower ends of ports 55 and 58.

After the operations just described, the operator shifts the handle 50 into the position shown by solid lines in Fig. 1, thereby returning the valve to its normal, or out-of-service, position, as illustrated in Figs. 1 and 10, and, in so doing, aperture 52 is positioned between ports 55 and 59, and thereby closed, and port 59 is likewise closed, thereby trapping compressed air in the chamber within cylinder 26 in front of the piston therein to retain the parts in their rearward, or retracted positions. During the forward movement of piston 19, cylinder 34 that is connected to the rear end of piston rod 25, will be moved forwardly over cylinder 26 and consequently sliding gauge ring 36 forwardly upon the last mentioned cylinder and upon the return of the parts to their normal, or out-of-service positions, said gauge ring will remain in the position to which it was moved by the cylinder 34.

The graduation shown upon the cylinder 26 is preferably such that the position of the forward edge of said gauge ring upon the graduated scale indicates the exact weight of the grease or similar material discharged from the device.

Bolt 23, that is seated in the forward end of piston 19, provides an adjustable stop to engage the inner surface of head 12 and limit the forward travel of said piston.

A grease measuring and dispensing device of our improved construction is comparatively simple, is capable of being readily operated and provides very efficient means whereby grease and like substances may be accurately measured and conveniently delivered directly into containers, such as differential gear housings, transmission gear casings, and the like, and for these reasons said device may be advantageously utilized in garages and automobile service stations.

It will be readily understood that minor changes in the size, form and construction of the various parts of our improved grease measuring and dispensing device may be made to substitute for those herein shown and described without departing from the spirit of our invention, the scope of which is set forth in the appended claims.

We claim as our invention:

1. In a grease measuring and dispensing device, a pair of axially alined cylinders, one of which is provided with grease inlet and outlet openings, a single piston rod passing lengthwise through said cylinders, pistons on said rods within said cylinders, means for admitting fluid pressure into the cylinder having the grease inlet and outlet openings to move the piston forwardly therethrough, said means permitting an exhaust of fluid pressure from said cylinder, and means for admitting fluid pressure alternatively to the other cylinder in front of the piston therein to move both pistons rearwardly through the cylinders.

2. In a grease measuring and dispensing device, a pair of axially alined cylinders, one of which is provided with grease inlet and outlet openings, a single piston rod passing lengthwise through said cylinders, pistons on said rods within said cylinders, means for admitting fluid pressure into the cylinder having the grease inlet and outlet openings to move the piston forwardly therethrough, said means permitting an exhaust of fluid pressure from said cylinder, and means for admitting fluid pressure to the other cylinder in front of the piston therein to move both pistons rearwardly through the cylinders, there being a scale upon the second cylinder, an indicator slidingly mounted upon the second cylinder, and means whereby the grease discharging impulse moves the indicator.

3. In a measuring and dispensing device, a dispensing cylinder having a discharge outlet, a fluid pressure cylinder, a single piston rod passing lengthwise through said cylinders, pistons carried by said piston rod and arranged within said cylinders, a valve that is connected to a source of fluid pressure, connections from said valve to said cylinders for admitting fluid pressure to the dispensing cylinder behind the piston therein said connections permitting the exhaust of fluid pressure from said dispensing cylinder, and connections for admitting fluid pressure to enter the fluid pressure cylinder in front of the piston therein to move both pistons rearwardly in their respective cylinders.

4. In a measuring and dispensing device, a dispensing cylinder having a discharge outlet, a fluid pressure cylinder, a single piston rod passing lengthwise through said cylinders, pistons carried by said piston rod and arranged within said cylinders, a valve that is connected to a source of fluid pressure, connections from said valve to said cylinders for admitting fluid pressure to the dispensing cylinder behind the piston therein said connections permitting the exhaust of fluid pressure from said dispensing cylinder, and connections for admitting fluid pressure to enter the fluid pressure cylinder in front of the piston therein to move both pistons rearwardly in their respective cylinders, and a bolt screw seated through the axial center of the front end of the piston, and a lock nut upon the bolt and forming an adjustable means for limiting the forward movement of the piston within the dispensing cylinder.

5. In a measuring and dispensing device, a dispensing cylinder, a fluid pressure cylinder in axial alinement with said dispensing cylinder, a single piston rod arranged for operation within said cylinders, pistons carried by said piston rod and arranged within said cylinders, means for admitting fluid pressure to the dispensing cylinder to the rear of the piston therein, means for admitting fluid pressure to the fluid pressure cylinder in front of the piston therein, and a manually operable valve being associated with said fluid pressure means which valve is constructed so as to permit the exhaust of fluid pressure from the dispensing cylinder while fluid pressure is permitted to enter the fluid pressure cylinder in front of the piston therein.

6. In a measuring and dispensing device, a dispensing cylinder, a fluid pressure cylinder in axial alinement with said dispensing cylinder, a single piston rod arranged for operation within said cylinders, pistons carried by said piston rod and arranged within said cylinders, means for admitting fluid pressure to the dispensing cylinder to the rear of the piston therein, means for admitting fluid pressure to the fluid pressure cylinder in front of the piston therein, a manually operable valve being associated with said fluid pressure means, which valve is constructed so as to permit the exhaust of fluid pressure from the dispensing cylinder while fluid pressure is permitted to enter the fluid pressure cylinder in front of the piston therein, and adjustable means carried by the piston within the dispensing cylinder for limiting its forward movement in the dispensing cylinder.

7. In a grease measuring and dispensing device, a cylinder provided with a discharge outlet, a piston arranged for operation within said cylinder, an auxiliary cylinder arranged to the rear of the first mentioned cylinder, a piston within said auxiliary cylinder, a piston rod connecting the two pistons, means for admitting compressed fluid to the cylinders to move the pistons forwardly and rearwardly therein and means comprising a part movable on the auxiliary cylinder for indicating the degree of forward travel of the piston in the first mentioned cylinder.

8. In a grease measuring and dispensing device, a cylinder provided with a discharge outlet, a piston arranged for operation within said cylinder, an auxiliary cylinder arranged to the rear of the first mentioned cylinder, a piston within said auxiliary cylinder, a piston rod connecting the two pistons, means for admitting compressed fluid to the cylinders to move the pistons forwardly and rearwardly therein, means comprising a part movable on the auxiliary cylinder at the discharge impulse for indicating the degree of forward travel of the piston in the first mentioned cylinder said admitting means comprising a single manually operable valve for controlling the flow of fluid pressure to and from said cylinders.

9. In a measuring and dispensing device, a dispensing cylinder having means providing a gravity inlet, a fluid pressure cylinder in axial alinement with said dispensing cylinder, a single piston rod arranged for operation within said cylinders, pistons carried by said piston rod and arranged within said cylinders, means for admitting fluid pressure to the dispensing cylinder to the rear of the piston therein, means for admitting fluid pressure to the fluid pressure cylinder in front of the piston therein to withdraw the piston in the dispensing cylinder to a position behind the inlet, said means comprising manually operable valve associated with said fluid pressure means, which valve is constructed so as to permit the exhaust of fluid pressure from the dispensing cylinder while fluid pressure is permitted to enter the fluid pressure cylinder in front of the piston therein, adjustable means carried by the piston within the dispensing cylinder for limiting its forward movement in the dispensing cylinder, and means including a graduated scale for indicating the forward movement of the piston within the dispensing cylinder.

10. In a measuring and dispensing device, a dispensing cylinder and a fluid pressure cylinder arranged in alinement with each other and horizontal, there being a head between the cylinders, a piston rod slidably mounted through the head, pistons upon the piston rod, in each cylinder, there being an inlet to the dispensing cylinder for feeding liquid to the dispensing cylinder by gravity and to a position in front of the piston when withdrawn, a valve mechanism and connections for admitting compressed air to the dispensing cylinder behind the piston and for admitting compressed air to the fluid pressure cylinder in front of the piston, a discharge hose and nozzle connected to the dispensing cylinder, and means for controlling the valve mechanism by the operator handling the nozzle and at a distance from the valve.

11. In a measuring and dispensing device, a dispensing cylinder, a fluid pressure cylinder connected to the dispensing cylinder in a line, the cylinders being mounted horizontal and there being a wall between the two cylinders, a piston rod extending through the wall, a piston on the piston rod in the dispensing cylinder, a piston on the piston rod in the fluid pressure cylinder, the piston rod extending beyond the piston in the fluid pressure cylinder, a tube enclosing the extension of the piston rod and clamped against the piston, a cylinder connected to the outer end of the extension of the piston rod against the tube and slidingly mounted upon the fluid pressure cylinder to move back and forth with the piston rod, a scale upon the fluid pressure cylinder, an indicator upon the fluid pressure cylinder and operated by the cylindrical member to move forwardly at the discharge impulse and to remain in indicating position and not be moved by the exhaust impulse.

In testimony whereof we have signed our names to this specification.

RICHARD CALLAHAN.
STEPHEN L. ROULEAU.